United States Patent
Hung

(10) Patent No.: US 9,057,482 B2
(45) Date of Patent: Jun. 16, 2015

(54) AUTO/SINGLE FUNCTIONS SELECTING DEVICE FOR GREASE GUN AND METHOD FOR OPERATING THE SAME

(76) Inventor: Fu-Tien Hung, Taichung (TW)

( * ) Notice: Subject to any disclaimer, the term of this patent is extended or adjusted under 35 U.S.C. 154(b) by 405 days.

(21) Appl. No.: 13/531,529

(22) Filed: Jun. 23, 2012

(65) Prior Publication Data

US 2013/0313051 A1    Nov. 28, 2013

(30) Foreign Application Priority Data

May 24, 2012  (TW) .............................. 101118500 A

(51) Int. Cl.
*F16N 3/12*    (2006.01)
*F16N 5/02*    (2006.01)
*F16N 11/10*   (2006.01)

(52) U.S. Cl.
CPC .. *F16N 5/02* (2013.01); *F16N 11/10* (2013.01)

(58) Field of Classification Search
CPC ..................................... F16N 5/02; F16N 3/12
USPC ............ 184/41, 55.1; 222/256–262, 396, 397
See application file for complete search history.

(56) References Cited

U.S. PATENT DOCUMENTS

| | | | | | |
|---|---|---|---|---|---|
| 1,965,038 | A | * | 7/1934 | Hartman | 91/226 |
| 2,114,507 | A | * | 4/1938 | Smith | 222/262 |
| 2,134,735 | A | * | 11/1938 | Reinhold | 222/262 |
| 2,183,013 | A | * | 12/1939 | Davis | 222/183 |
| 2,259,857 | A | * | 10/1941 | Ostendorf | 417/401 |
| 2,505,839 | A | * | 5/1950 | Scovell | 222/262 |
| 3,094,901 | A | * | 6/1963 | Wandel et al. | 91/454 |
| 3,813,012 | A | * | 5/1974 | Laird | 222/326 |
| 3,983,947 | A | * | 10/1976 | Wills et al. | 173/169 |
| 4,113,151 | A | * | 9/1978 | Brown et al. | 222/324 |
| 5,067,591 | A | * | 11/1991 | Fehlig | 184/55.1 |
| 5,474,214 | A | * | 12/1995 | Chung et al. | 222/262 |
| 5,586,482 | A | * | 12/1996 | Leonard | 91/519 |
| 6,494,347 | B1 | * | 12/2002 | Yeh | 222/262 |
| 6,736,292 | B2 | * | 5/2004 | Grach et al. | 222/262 |
| 6,883,687 | B2 | * | 4/2005 | Chuang | 222/389 |
| 6,923,348 | B2 | * | 8/2005 | Grach et al. | 222/262 |
| 6,935,541 | B1 | * | 8/2005 | Campbell et al. | 222/380 |
| 7,334,709 | B1 | * | 2/2008 | Huang | 222/334 |

* cited by examiner

*Primary Examiner* — William A Rivera
*Assistant Examiner* — Michael Riegelman

(57) ABSTRACT

The auto/single functions selecting device of a grease gun includes a switch unit connected to the main body of the grease gun. When the user switches the switch unit to the first position, a single shot is available when pulling the trigger one time. When the user switches the switch unit to the second position, the grease is continuously supplied when keep pulling the trigger. The grease gun provides the function of single shot and the function of auto shot.

9 Claims, 9 Drawing Sheets

AUTO/SINGLE FUNCTIONS SELECTING DEVICE FOR GREASE GUN AND METHOD FOR OPERATING THE SAME

FIELD OF THE INVENTION

The present invention relates to a pneumatic grease gun, and more particularly, to a pneumatic grease gun with auto/single functions selecting device.

BACKGROUND OF THE INVENTION

Grease is added to the gear box or the transmission shaft for most of the heavy duty tools or vehicles so as to lubricate the gears and bearings and movable parts to reduce friction. The adding of the grease is made by using a grease gun 9 which is disclosed in FIG. 9. The grease stored in the grease can 92 is injected to the gear box or the transmission shaft via the outlet 93 of the body 91 of the gun 9.

The conventional pneumatic grease gun 9 is operated in single shot each time so that when a large amount of grease is needed, the user has to repeatedly pull the trigger 94, and this is not convenient. TW-M279793 discloses a grease gun which provides a large amount of grease by one operation of the trigger to improve the shortcoming of the conventional pneumatic grease gun.

However, when operating the grease gun that supplies a large amount of grease within one shot, the amount of the grease may be much more than needed. This becomes waste of the grease.

The present invention intends to provide a grease gun with an auto/single functions selecting device which allows the user to choose desired function to get the desired amount of grease.

SUMMARY OF THE INVENTION

The present invention relates to an auto/single functions selecting device of a grease gun. A pressurized air source is connected to the handle of the grease gun and the handle of the grease gun has a primary path, a return path, an air release path, a recess and a valve unit. By pulling the trigger, the valve unit changes the directions of the pressurized air to move the piston to control the grease to be supplied in the single mode of one shot at a time, or the auto mode of providing continuous grease.

The auto/single functions selecting device comprises a switch unit connected to the main body of the grease gun. When the user switches the switch unit to the first position, a single shot is available when pulling the trigger one time. When the user switches the switch unit to the second position, the grease is continuously supplied when keep pulling the trigger. The grease gun provides the function of single shot and the function of auto shot.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
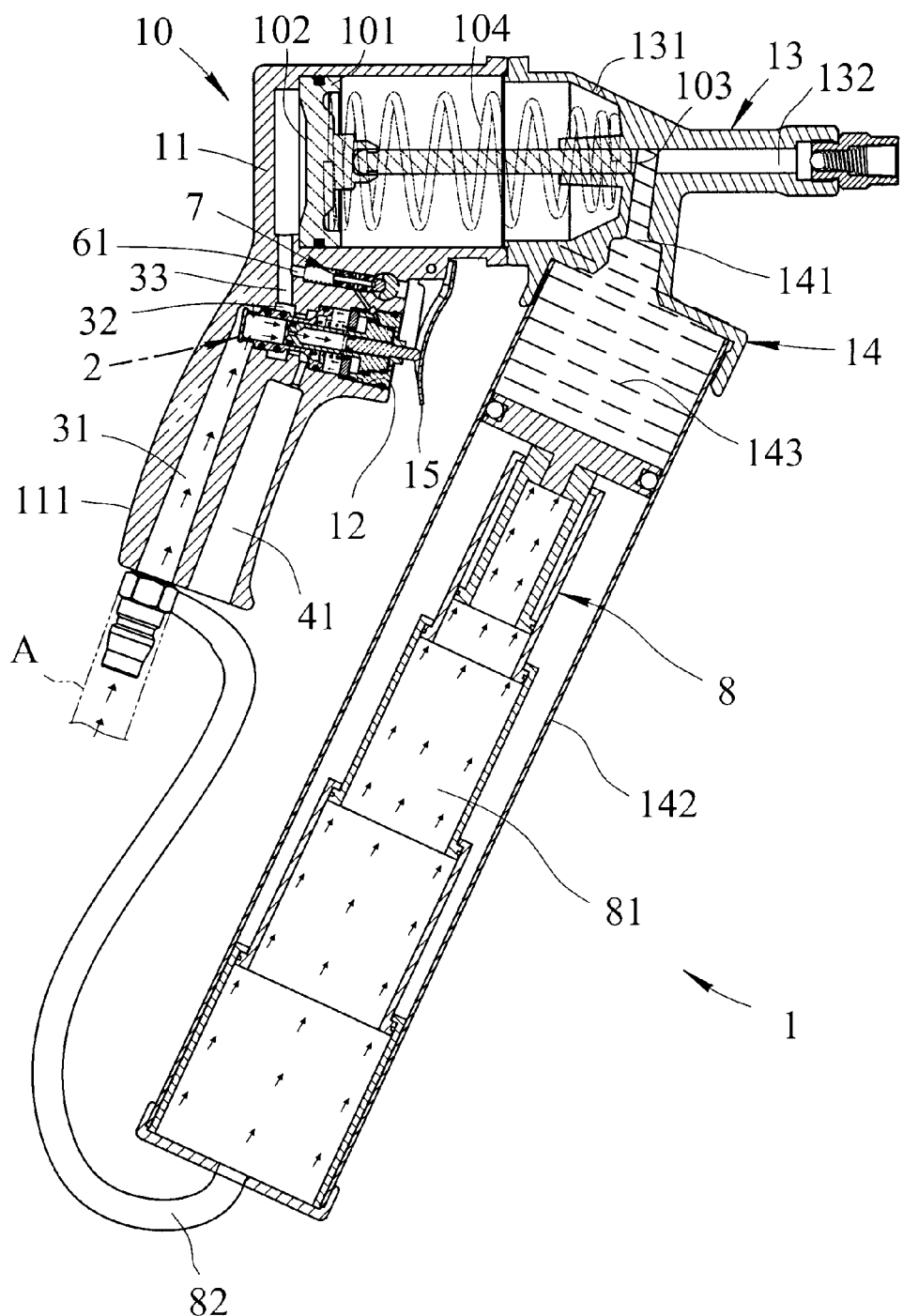
FIG. 1 is a cross sectional view of the grease gun with the auto/single functions selecting device of the present invention.
Figure 2:
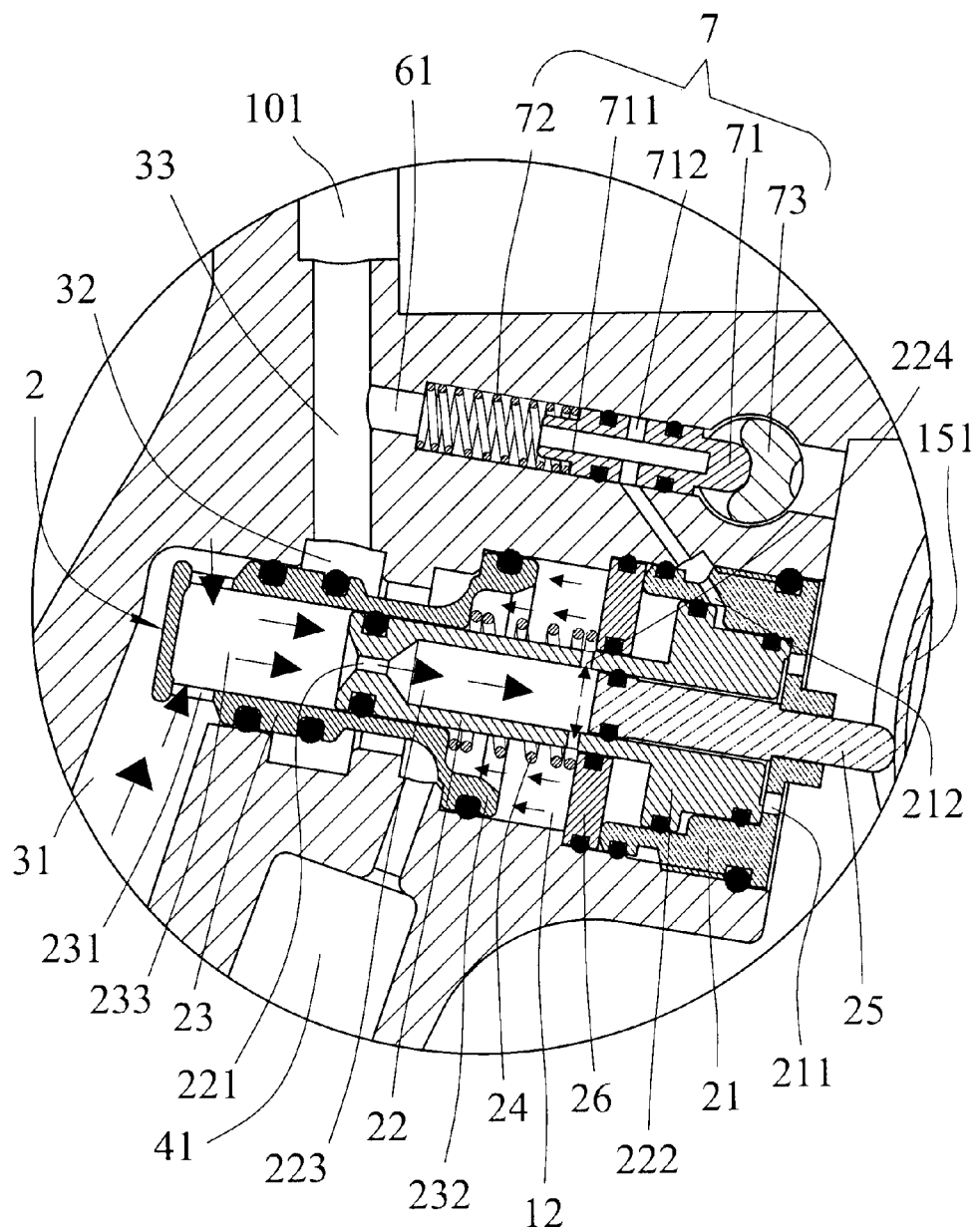
FIG. 2 is an enlarged cross sectional view of the valve unit and the switch unit, wherein the switch unit is switched to the second position.

Referring to FIGS. 1 and 2, the auto/single functions selecting device of an auto/single functions selecting device of a grease gun comprises a main body 10 which is composed of a front part 13 and a rear part 11. The main body 10 has a handle 111 connected to the rear part 11 and the main body 10 has a chamber 101 in which a piston 102, a piston rod 103 and a spring 104 are received. The handle 111 has a recess 12 and a grease can holder 14 is connected to the front part 13 of the main body 10. An air exit 131 is defined through the front part 13. A valve unit 2 is located in the recess 12 by an end member 21 and the end member 21 has an air exit 211. A primary path 3 is defined in the handle 111 and communicates between the chamber 101 and a pressurized air hose "A". The primary path 3 is composed of a main air path 31, a first air path 32 and a second air path 33. The first air path 32 communicates with the recess 12 and the second air path 33 communicates with the chamber 101. The recess 12 communicates with the mediate portion of the chamber 101. An air release path 4 is defined in the handle 111 and communicates with the recess 12 and opens to the underside of the handle 111. A return path 5 is partially defined in common with a section of the primary path 3 and communicates with the recess 12 via the valve unit 2. The valve unit 2 controls the direction of the pressurized air in the primary path 3, the air release path 4 and the return path 5. A trigger 15 is pivotably connected to the main body 10 and contacts the valve unit 2. An auto/single control path 6 is located between the second air path 33 and the recess 12, and communicates with the recess 12 from the primary path 3. The auto/single control path 6 is composed by the third air path 61 and the valve unit 2. A switch unit 7 is located in the auto/single control path 6 and controls the auto and single functions. A pneumatic driving unit 8 has retractable tubes 81, and a connection hose 82 is connected between the main air path 31, the pressurized air hose "A" and the retractable tubes 81.

Figure 3:
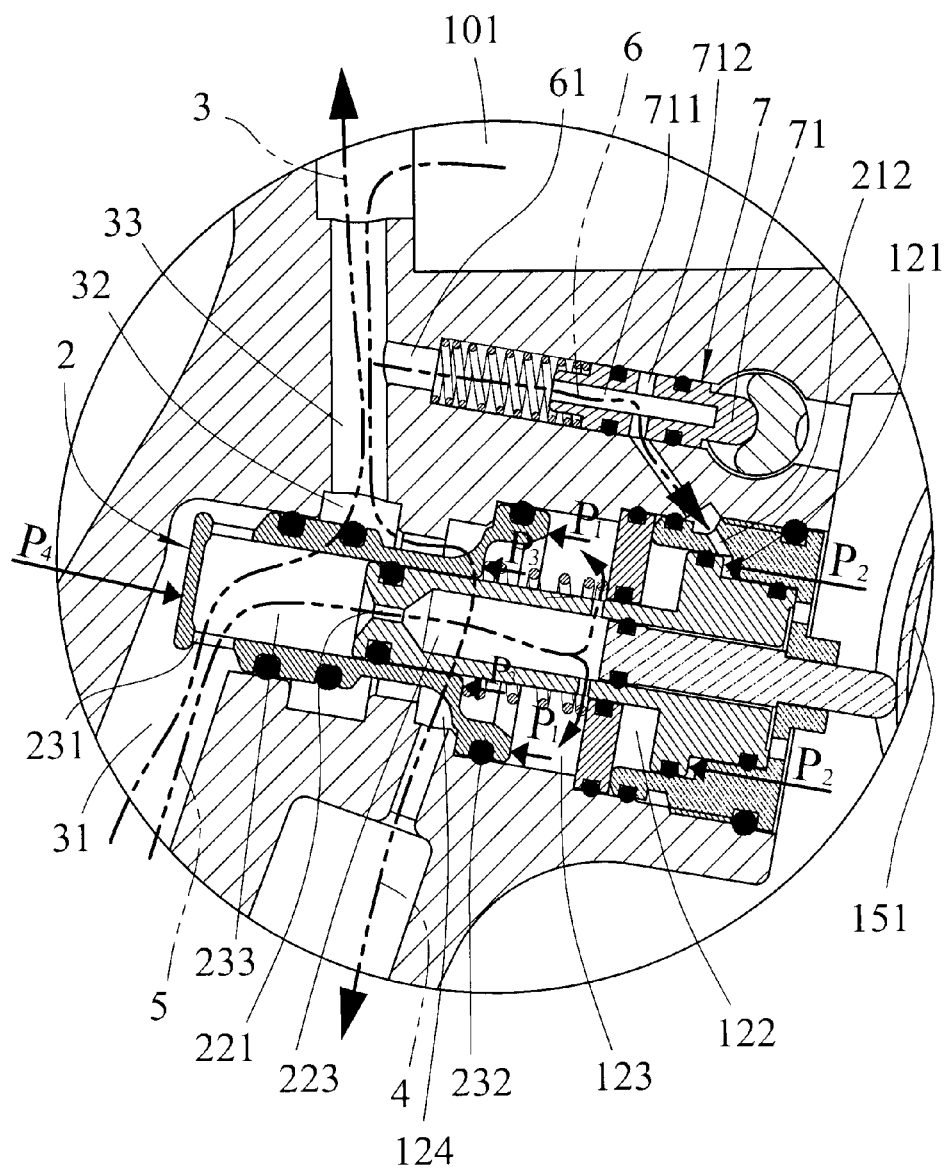
FIG. 3 shows the pressurized air flowing through each of the paths of the auto/single functions selecting device of the present invention.

As shown in FIGS. 2 and 3, the valve unit 2 comprises a separation board 26. A first room 121 and a second room 122 are defined by the separation board 26, the end member 21, the recess 12 and the first piston 222. A third room 123 and a fourth room 124 are defined by the separation board 26, the end member 21, the recess 12 and the second piston 232.

As shown in FIG. 3, the primary path 3 is composed of the main air path 31, the first air path 32 and the second air path 33 in sequence, and eventually communicates with the chamber 101, when the primary path 3 is opened, the piston 102 is moved forward. The pressure in the main air path 31 applies a right push force P4 to the second valve 23. The path of the air release path 4 starts from the chamber 101, the second air path 33, the first air path 32, the recess 12 and then communicates with the first air release path 41. When the air release path 4 is opened, the spring 104 returns the piston 102 to its initial position, and the air pressure behind the piston 102 is released from the main body 10. The return path 5 starts from the main air path 31, the recess 12, the second inlets 231 of the second valve 23, the second space 233, the first inlets 221 of the first valve 22, the first passage 224 and then reaches the third room 123. The pressure applies a left push force P1 to second piston 232. The auto/single control path 6 starts from the third air path 61, the air intake hole 711 and the transverse hole 712 of the switch rod 71 and to the through hole 212 of the end member 21. When the auto/single control path 6 is opened, the air pressure is introduced from the second air path 33 and enters into the air intake hole 711 and the transverse hole 712 of the switch rod 71, the through hole 212 of the end member 21 and then enters into the first room 121. The pressure applies a left push force P2 to the first piston 222.

Figure 4:
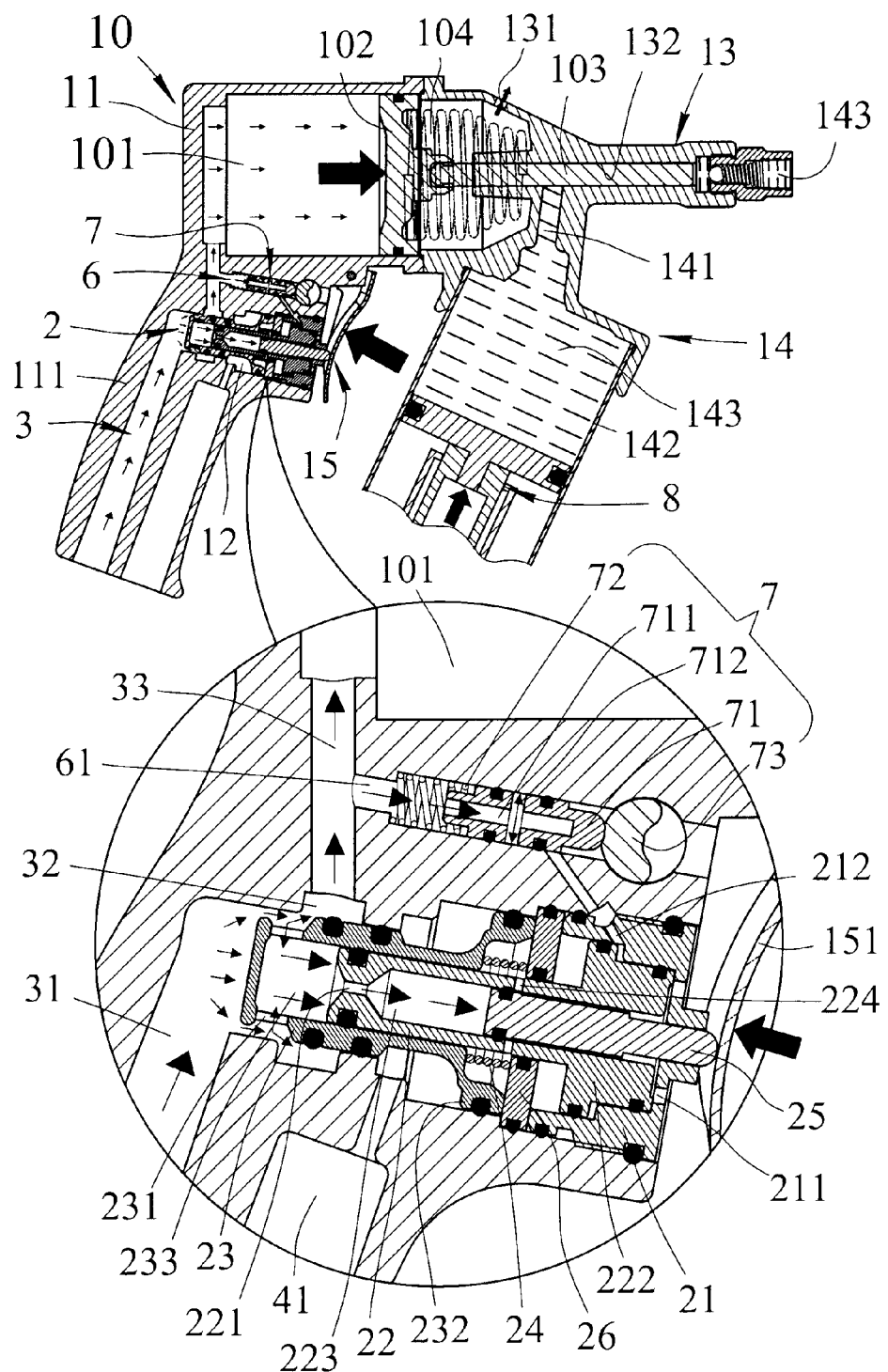
FIG. 4 shows the movement of the piston when the grease gun is operated in single shot function.
Figure 5:
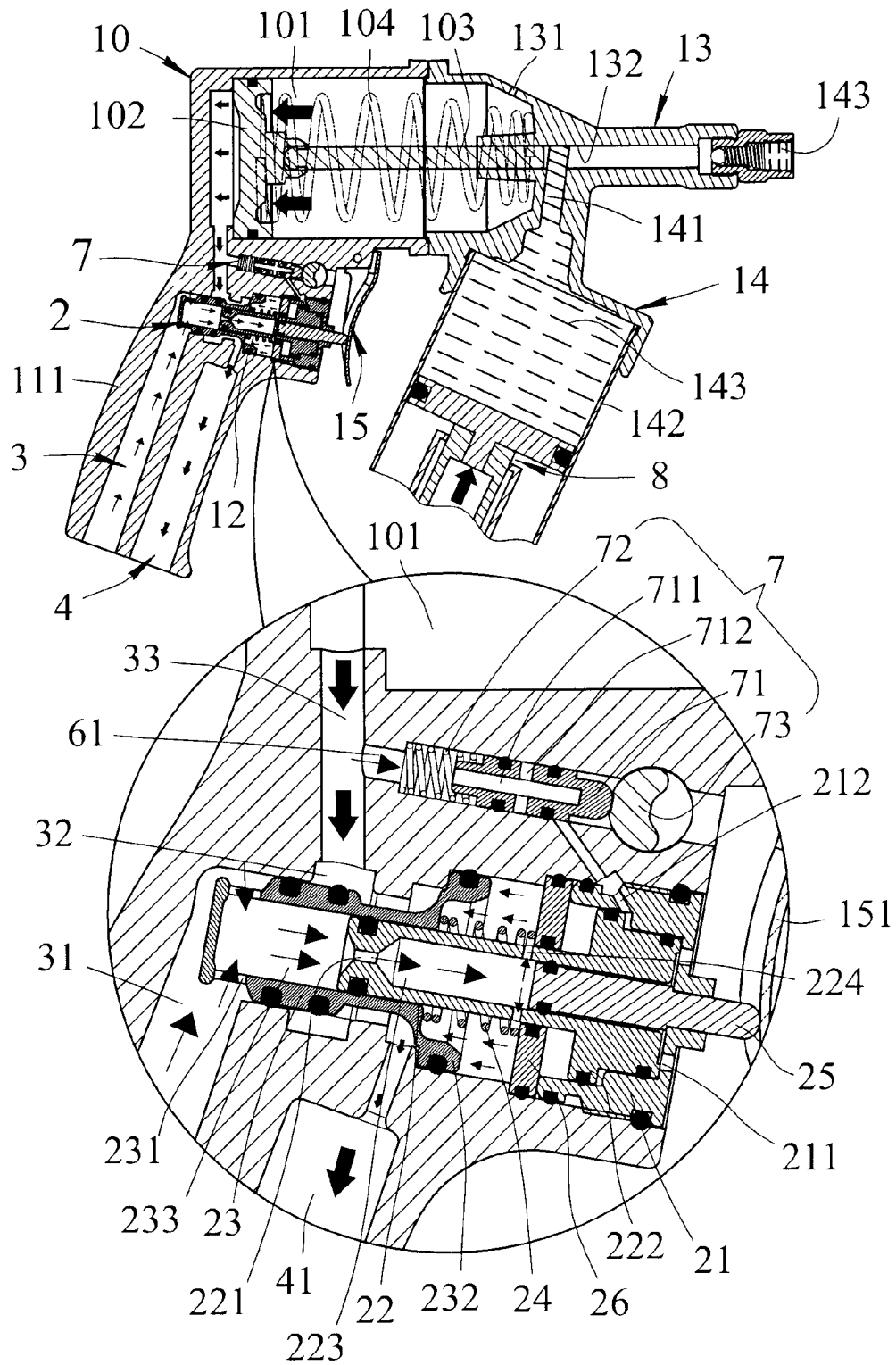
FIG. 5 shows that the piston is returned when the grease gun is operated in single shot function.

Referring to FIGS. 1, 3 and 4, when using the single function, the pressurized air hose "A" is connected to the grease gun 1, the pressurized air is introduced into the retractable tubes 81 of the pneumatic driving unit 8 so that the grease 143 in the grease can 142 enters the first path 132 via the grease outlet 141. The user rotates the knob 73 to the first position as shown in FIG. 4, the switch rod 71 moves into the third air path 61 and compresses the assistance spring 72 to close the auto/single control path 6. When the pressurized air passes through the return path 5, a left push force P1 is applied to the second piston 232 which also receives a left push force P3 from the second spring 24. The sum of the left push force P1 and the left push force P3 is larger than the right push force P4, so that the second valve 23 moves left and seals the primary path 3 while the air release path 4 is opened. Therefore, the piston 102 does not act to inject the grease or return.

As shown in FIGS. 3 and 4, when the trigger 15 is pulled, the elongate member 151 pushes the rod 25 into the first space 223 to seal the return path 5 so that the left push force P1 is disappeared. The second piston 232 is only applied by the left push force P3 from the second spring 24. The left push force P3 is smaller than the right push force P4 from the second valve 23, so that the second valve 23 moves right. The primary path 3 is opened and the piston 12 is moved forward. There is no air released from the air exit 131, the grease 241 in the first path 132 is ejected from the grease gun 1. When the user releases the trigger 15, the rod 25 is moved right by the pressure in the return path 5. The return path 5 is opened and the rod 25 is pushed right and the left push force P1 is formed again to move the second piston 232 left. The primary path 3 is sealed while the air release path 4 is opened, the spring 104 in the chamber 101 returns the piston 102, and the air in the chamber 101 is released from the air release path 4.

Figure 6:
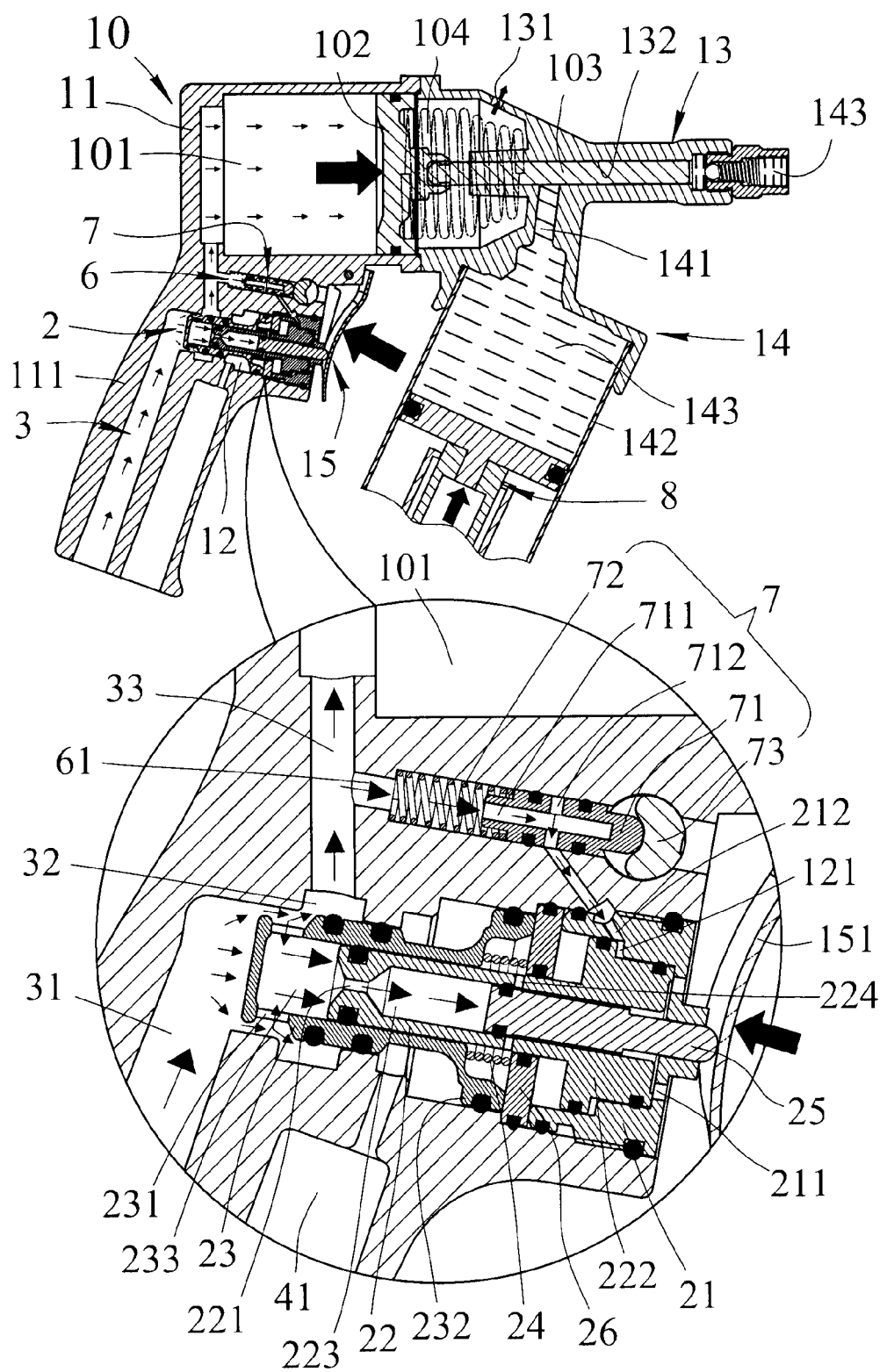
FIG. 6 shows the first movement of the piston when the grease gun is operated in auto shot function.
Figure 7:
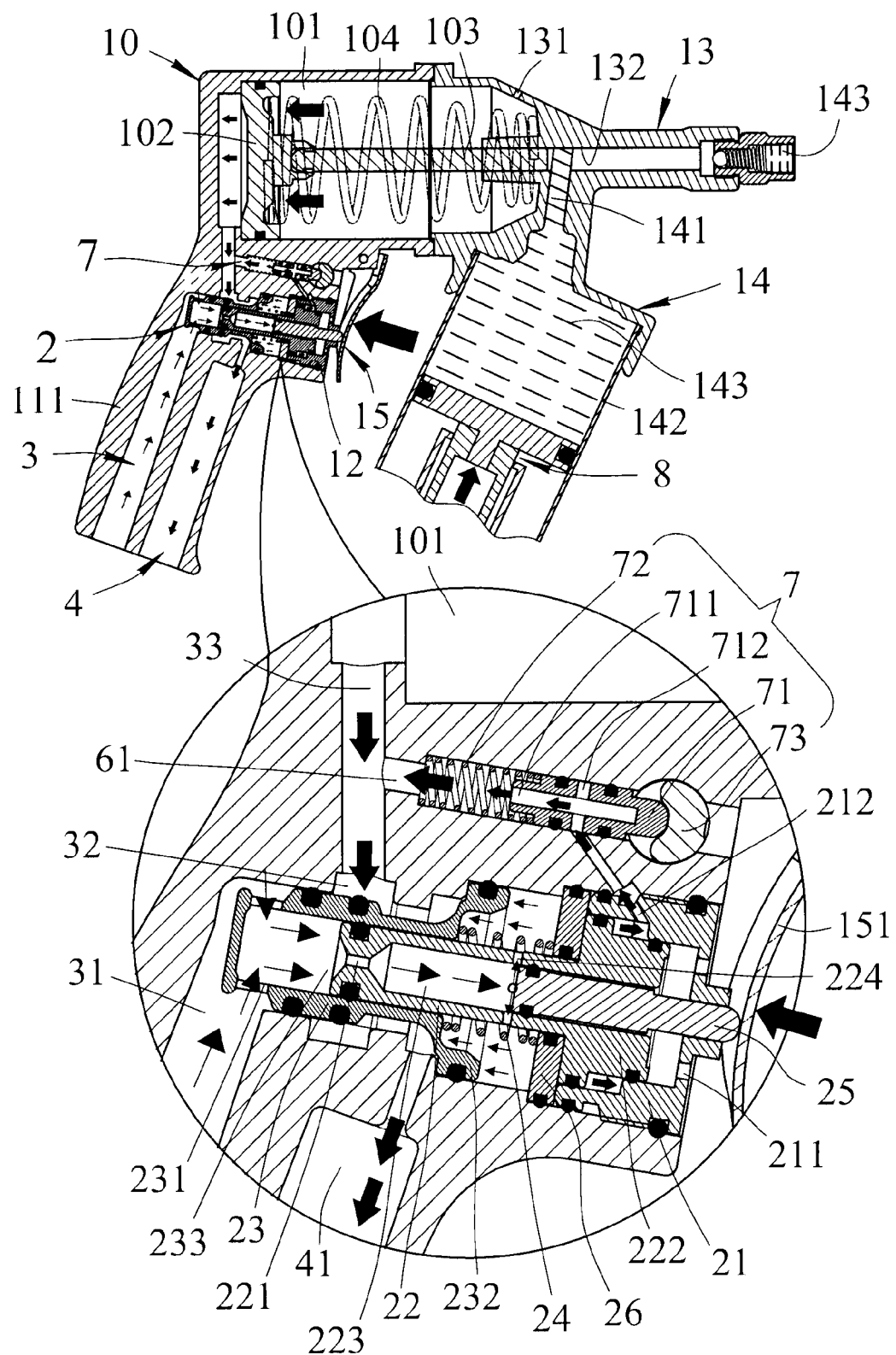
FIG. 7 shows that the piston is returned when the grease gun is operated in the auto shot function.

Referring to FIGS. 2 and 3, when the switch unit 7 is switched to the second position, the transverse hole 712 is located in alignment with the auto/single control path 6 which is opened and the pressure in the auto/single control path 6 applies the left push force P2 to the first piston 222. As shown in FIGS. 3, 6, when the user holds the trigger 15 to eject the grease, the left push force P2 generated by the auto/single control path 6 pushes the first piston 222 left. The return path 5 is opened and the left push force P1 is formed again, and the second piston 232 is moved left and seals the primary path 3, while the air release path 4 is opened as shown in FIGS. 3 and 7. The spring 104 in the chamber 101 returns the piston 102 and the air in the chamber 101 is released from the grease gun to finish the first injection of the grease.

Figure 8:
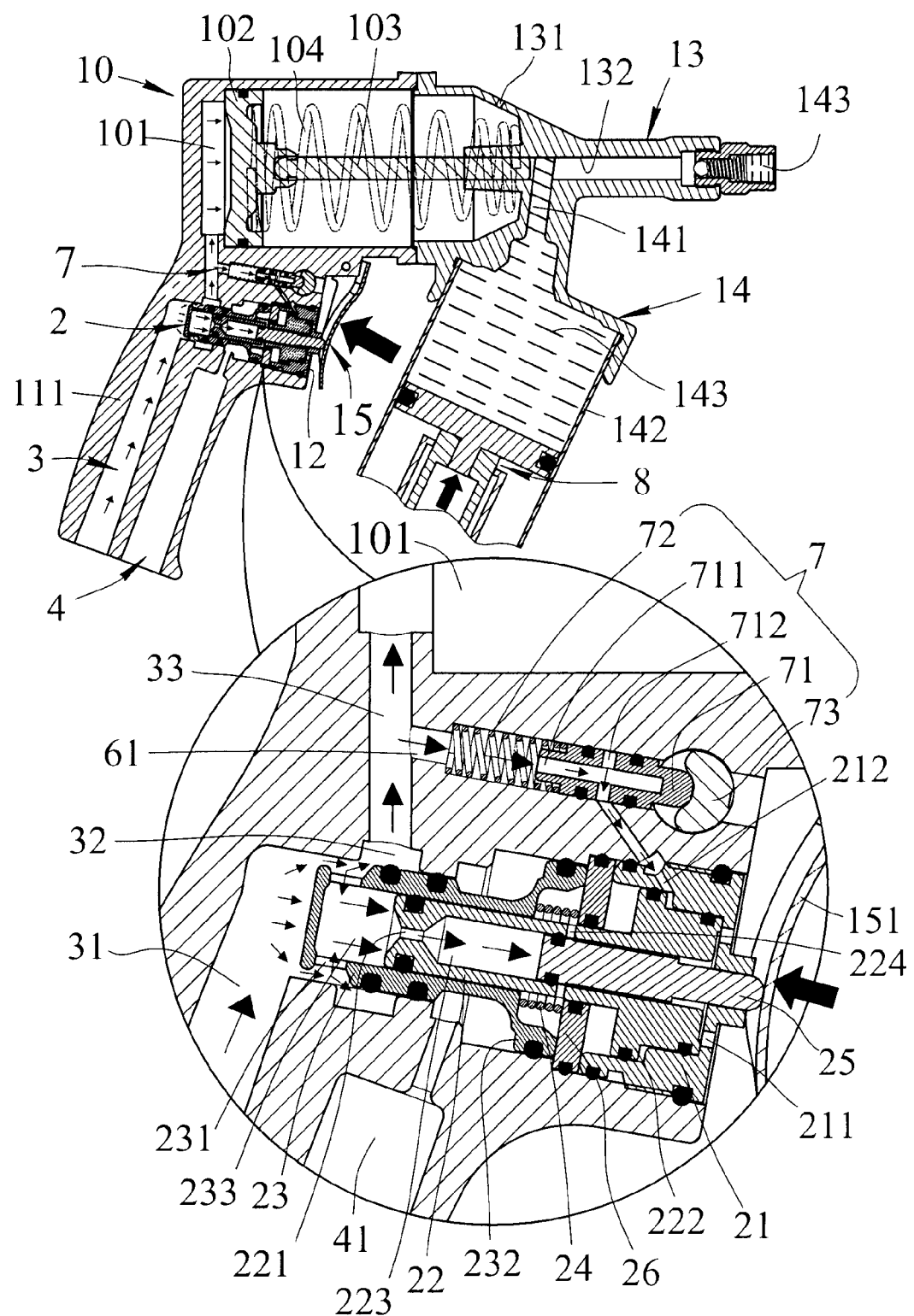
FIG. 8 shows the following movement of the piston when the grease gun is operated in auto shot function.
Figure 9:
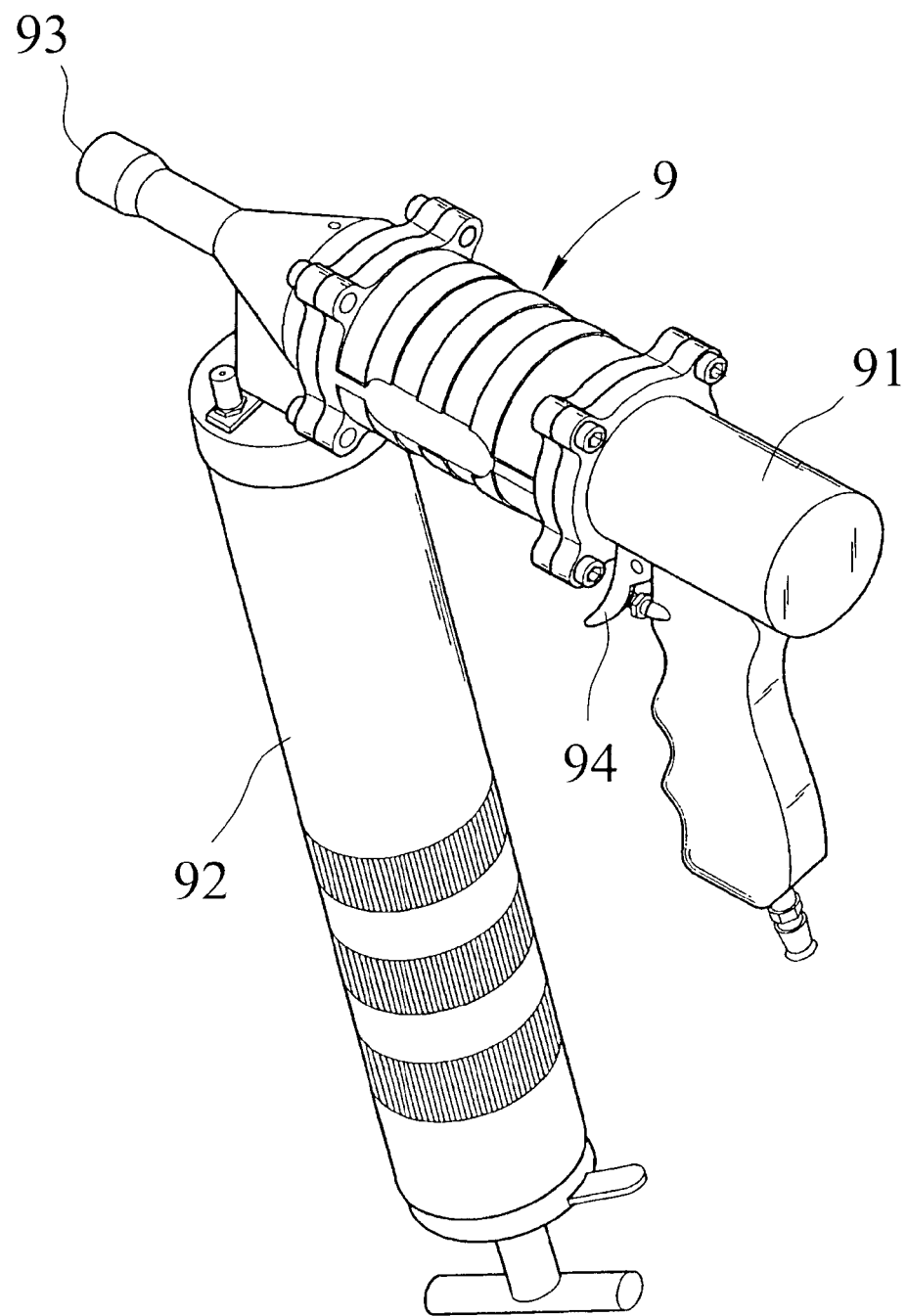
FIG. 9 shows the conventional grease gun.

As shown in FIGS. 3 and 7, when the first time inject is completed and the piston returns while the trigger 15 is still held, because the air in the auto/single control path 6 is released from the auto/single control path 6 and the primary path 3. The left push force P2 applied to the first piston 222 is disappeared, the first valve 22 moves right as shown in FIGS. 3 and 8. The return path 5 is sealed and the left push force P1 is disappeared. The second valve 23 moves right because of the right push force P4 so that the primary path 3 is opened and the grease 143 is injected. The auto/single control path 6 is opened and the pressure enters into the first room 121 and the left push force P2 is formed which is applied to the first piston 222. The first valve 22 is moved left to open the return path 5. The left push force P1 is formed and the second piston 232 returns left to seal the primary path 3 and open the air release path 4. This returns the piston 102 and the air in the chamber 101 is released from the grease gun to complete the second inject of the grease. The steps are repeated to proceed the third time injection, the fourth time inject and so on until the trigger 15 is released. The piston 102 is eventually returned to its initial piston, the auto function is then stopped.

While we have shown and described the embodiment in accordance with the present invention, it should be clear to those skilled in the art that further embodiments may be made without departing from the scope of the present invention.

What is claimed is:

1. An auto/single functions selecting device of a grease gun, comprising:

a main body (10) having a chamber (101) defined therein, the chamber (101) having a piston (102), a piston rod (103), a spring (104) and a first air exit (131) defined in the main body (10), a handle (111) connected to the main body (10) and having a recess (12), a grease can holder (14) connected to the main body (10);

a valve unit (2) located in the recess (12) by an end member (21), the end member (21) having a second air exit (211) defined therethrough, the valve unit (2) comprising a hollow first valve (22), a hollow second valve (23), a second spring (24) and a rod (25), the first valve (22) having a first inlet (221) in a first end thereof, a second end of the first valve (2) having a first piston (222) and a first space (223) located therein, the second valve (23) having multiple second inlets (231) defined in a first end thereof, a second end of the second valve (23) having a second piston (232) and a second space (233), the second valve (23) located in the recess (12), the first valve (22) inserted in the second spring (24), the rod (25) of the valve unit (2) having one end inserted into the first space (223), the other end of the rod (25) of the valve unit (2) extending beyond the end member (21) and contacting an elongate member (151) of the trigger (15);

a primary path (3) defined in the handle (111) and communicating between the chamber (101) and a pressurized air hose (A), the recess (12) communicating with a mediate portion of the chamber (101);

an air release path (4) defined in the handle (111) and communicating with the recess (12) and opening to an underside of the handle (111);

a return path (5) partially defined in common with a section of the primary path (3) and communicating with the recess (12) via the valve unit (2), the valve unit (2) controlling direction of the pressurized air in the primary path (3), the air release path (4) and the return path (5);

a trigger (15) pivotably connected to the main body (10) and contacting the valve unit (2);

an auto/single control path (6) communicating with the recess (12) from the primary path (3);

a switch unit (7) located in the auto/single control path (6) and controlling auto and single functions, and a pneumatic driving unit (8) connected to the pressurized air hose (A) via a connection hose (82).

2. The device as claimed in claim 1, wherein the main body (10) is composed of a front part (13) and a rear part (11).

3. The device as claimed in claim 1, wherein the primary path (3) is composed of a main air path (31), a first air path (32) and a second air path (33), the first air path (32) communicates with the recess (12) and the second air path (33) communicates with the chamber (101).

4. The device as claimed in claim 1, wherein the grease can holder (14) is connected to lower portion of the front part (13), a first path (132) is located in the front part (13) and the piston rod (103) in the chamber (101) extends into the first path (132), the piston rod (103) is connected to the piston (102), the grease can holder (14) has a grease inlet (141) which communicates with the first path (132) of the front part (13).

5. The device as claimed in claim 1, wherein a grease can (142) has a top thereof connected to the grease can holder (14), a bottom of the grease can (142) is inserted into the pneumatic driving unit (8).

6. The device as claimed in claim 1, wherein the pneumatic driving unit (8) has retractable tubes (81), the connection hose (82) is connected between the main air path (31) and the retractable tubes (81).

7. The device as claimed in claim 1, wherein the valve unit (2) comprises a separation, board (26), a first room (121) and a second room (122) are defined by the separation board (26), the end member (21), the recess (12) and the first piston (222), a third room (123) and a fourth room (124) are defined by the separation board (26), the end member (21), the recess (12) and the second piston (232).

8. The device as claimed in claim 1, wherein the switch unit (7) comprises a switch rod (71), a assistance spring (72) and a knob (73) located in the auto/single control path (6), the knob (73) is exposed from a side of the main body (10), the auto/single control path (6) communicates with a through hole (212) in the end member (21), the switch rod (71) has an air intake hole (711), a transverse hole (712) is defined transversely through the switch rod (71) and communicates with the air intake hole (711), by operation to the knob (73), the switch rod (71) is moved to close or open the auto/single control path (6).

9. The device as claimed in claim 8, wherein the transverse hole (712) is located in alignment with the through hole (212) of the end member (21), the auto/single control path (6) is opened.

\* \* \* \* \*